United States Patent [19]

Ito et al.

[11] 4,385,358

[45] May 24, 1983

[54] ROBOT

[75] Inventors: Yoshimasa Ito; Junji Hashizume, both of Yokohama, Japan

[73] Assignee: Tokico Ltd., Kawasaki, Japan

[21] Appl. No.: 195,947

[22] Filed: Oct. 10, 1980

[30] Foreign Application Priority Data

Oct. 19, 1979 [JP] Japan .............................. 54-135003
Oct. 19, 1979 [JP] Japan .............................. 54-135004
Oct. 19, 1979 [JP] Japan .............................. 54-135005

[51] Int. Cl.³ ........................................... G05B 19/42
[52] U.S. Cl. ................................. 364/513; 364/577; 318/573
[58] Field of Search ............... 364/513, 577; 318/573, 318/559

[56] References Cited

U.S. PATENT DOCUMENTS

| | | | |
|---|---|---|---|
| 4,025,838 | 5/1977 | Watanabe | 364/513 X |
| 4,086,522 | 4/1978 | Engelberger et al. | 364/513 X |
| 4,119,900 | 10/1978 | Kremnitz | 364/513 X |
| 4,150,326 | 4/1979 | Engelberger et al. | 318/563 |
| 4,178,632 | 12/1979 | Anthony | 364/513 |
| 4,221,997 | 9/1980 | Flemming | 364/513 X |
| 4,258,425 | 3/1981 | Ramsey et al. | 364/513 |
| 4,263,538 | 4/1981 | Richiardi | 318/573 X |
| 4,283,764 | 8/1981 | Crum et al. | 364/513 |
| 4,287,459 | 9/1981 | Aktiebolag | 364/513 X |

FOREIGN PATENT DOCUMENTS 1511609 of 1978 United Kingdom.

Primary Examiner—Edward J. Wise
Attorney, Agent, or Firm—Wegner & Bretschneider

[57] ABSTRACT

A robot is disclosed having a robot manipulator, detectors for detecting the positions between each of the movable members of the manipulator, a memory unit for successively storing positional signals supplied from the detectors upon teaching operation, interpolating operation circuits for executing interpolating operation based on two positional signals which are read out from the memory unit in order to determine required number of positions between the two positional signals thus read out upon playback operation, and servo circuits for positioning each of the movable members of the manipulator by the operation result signals from the interpolating operation circuits.

19 Claims, 5 Drawing Figures

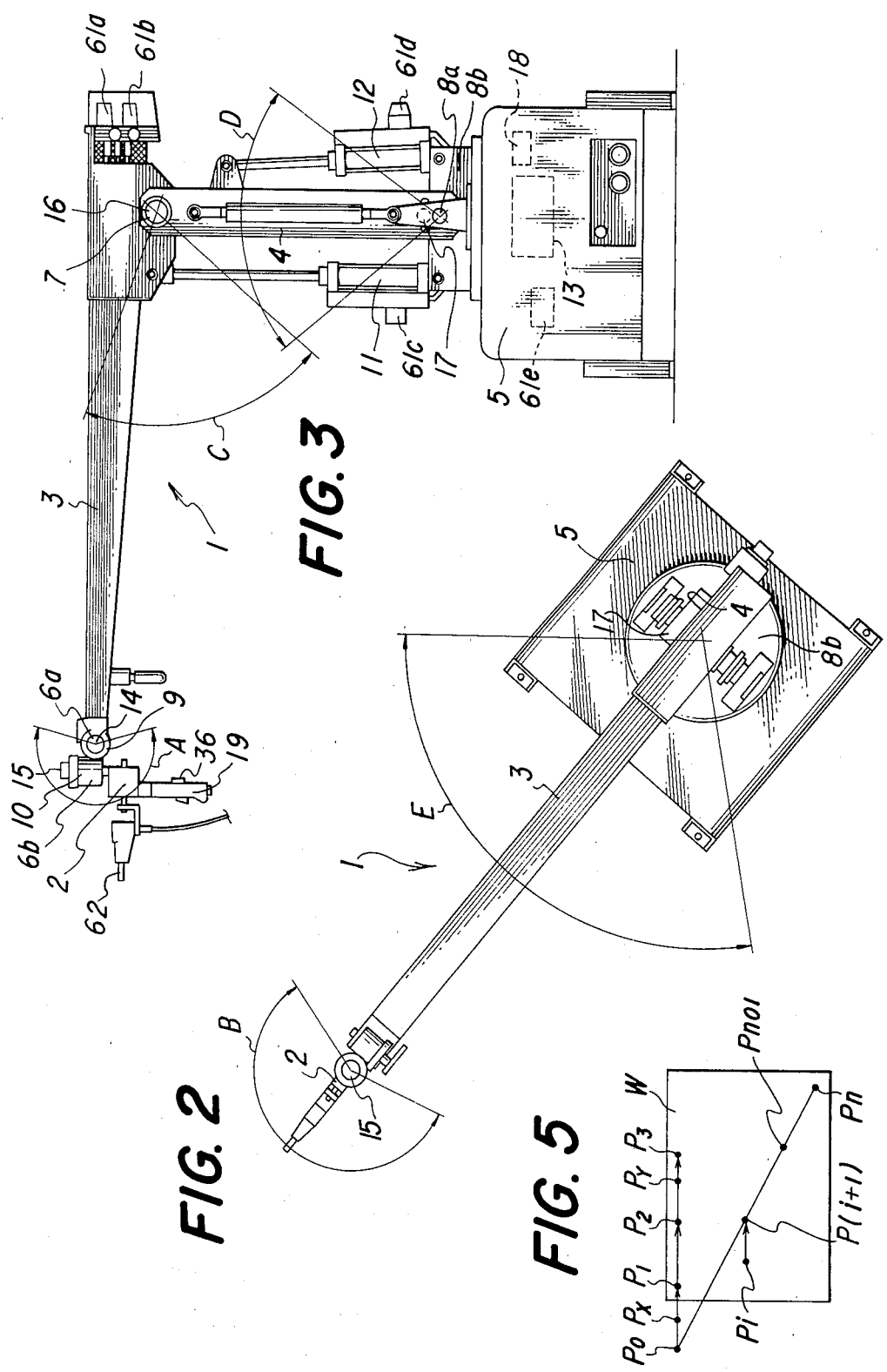

ROBOT

This invention relates to a robot and, more particularly, to a so-called teaching-playback type robot.

Teaching-playback type robots have been known, for example, for painting use, in which the top end of a robot manipulator having a spray nozzle is moved by an operator to conduct simulated painting work to an object to be painted with simultaneous storing for the contents of the work in a memory unit (generally referred to as teaching operation) and, after the store for all of the contents of the works, the contents of the works thus stored are read out and the actual painting work is conducted automatically following the read out content of the work (generally referred to as playback operation).

In the conventional robot of such a type, however, the capacity of the memory unit has to be extremely large for successively storing the contents of the works in the memory unit in the teaching operation to thus increasing the cost.

In addition, correction even for a part of the programmed contents of the works in the teaching operation has been conducted by repeating the teaching operation all over again and storing all of the contents of the work including partially corrected contents again to the memory unit. In view of the above, conventional teaching-playback type robots have certain drawbacks.

An object of this invention is to provide a robot which can be constituted with a memory unit of smaller capacity and can perform partial correction easily.

Another object of this invention is to provide a robot which stores dispersive positions as positional signals upon teaching operation, thereby enable the use of a memory unit of small capacity.

Another object of this invention is to provide a robot which determines interpolated positions based on the positional signals obtained in a dispersive manner to thereby perform positioning, in order to move the robot smoothly.

A further object of this invention is to provide a robot in which the number of divisions can be set optionally as required for conducting fine operation.

A still further object of this invention is to provide a robot which can store, in a compressed manner, the operation data to the manipulator main body at enable the use of a memory unit of small capacity.

A still further object of this invention is to provide a robot which can easily correct the stored position by a corrector to enable an increased working efficiency and a significantly improved productivity.

This invention provides a robot comprising a manipulator having a plurality of movable members connected to each other with joints, detection means for detecting the relative positions of the movable members to each other at each of the joints, designation means for designating positional signals supplied from the detection means, memory means for successively storing the positional signals designated by the designation means, interpolating operation means for executing interpolating arithmetic operation based on two positional signals read out from the memory means in order to determine a required number of positions between the positions corresponding to the two positional signals thus read out upon playback, and means for positioning each of the movable members of the manipulator referring to the operation result signals from the interpolating operation means as command values and based on the positional signals from the detection means as present values.

This invention also provides a teaching-playback type robot comprising memory means for storing actuation information for playback operation to the manipulator and comparison means for comparing the actuation information at a first teaching position and the actuation information at a second teaching position succeeding to the first teaching position, in which the actuation information at the second teaching position is stored in the memory means as the actuation information for the playback operation by the detection of a predetermined change in the actuation information by the comparison means.

This invention is to be described by way of preferred embodiments referring to the drawings, by which the foregoing and other objects, as well as features of this invention will become more apparent.

FIG. 2 is a plan view of the robot manipulator shown in FIG. 1;

FIG. 3 is a side view of the robot manipulator shown in FIG. 1;

FIG. 5 is an explanatory view of the teaching position and the teaching-playback operation.

Figure 1:
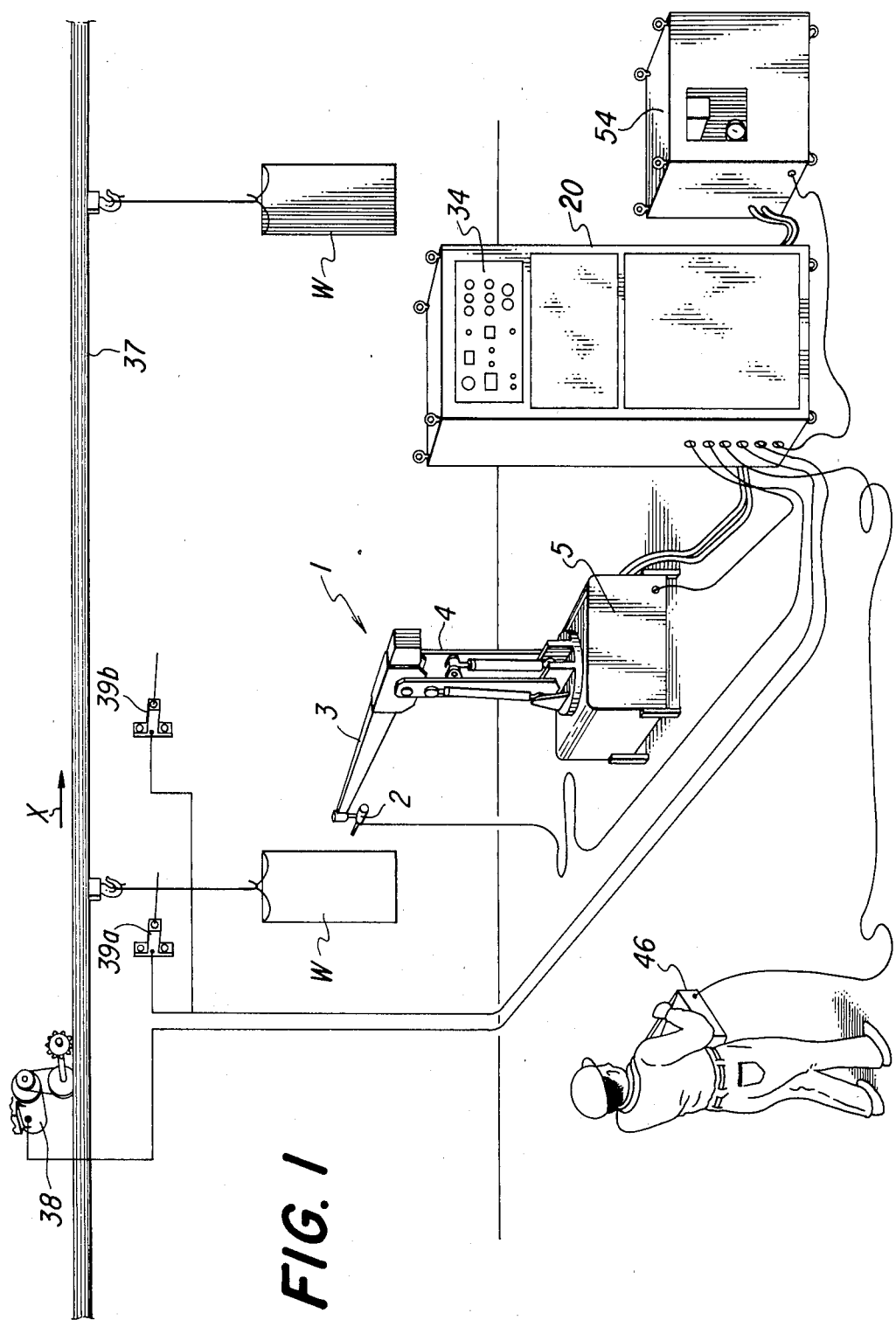
FIG. 1 is an explanatory view of a robot system as a preferred embodiment of this invention.

In the drawings, a robot manipulator 1 comprises a wrist 2, an arm 3 and a support post 4 as movable members and a stationary bed 5. The wrist 2 and the arm 3 are connected with joints 6a and 6b in which the wrist 2 is made rotatable to the arm 3 in a vertical plane within an angle A, as well as in the plane in perpendicular to the vertical plane within an angle B. The arm 3 and the support post 4 are connected with a joint 7, and the support post 4 and the stationary bed 5 are connected with joints 8a and 8b, in which the arm 3 is made rotatable to the support post 4 in a vertical plane within an angle C, and the support post 4 is made rotatable to the stationary bed 5 in a vertical plane within an angle D and also in the plane in perpendicular to the vertical plane within an angle E.

The arm 3 and the wrist 2 have hydraulic actuators 9 and 10 for rotating the wrist 2 to the arm 3 within the ranges of the angle A and the angle B, the arm 3 and the support post 4 have therebetween a hydraulic actuator 11 for rotating the arm 3 to the support post 4 within the range of the angle C and the support post 4 and the stationary bed 5 have hydraulic actuators 12 and 13 respectively for rotating the support post 4 to the stationary bed 5 within the ranges of the angle D and the angle E respectively.

The joints 6a and 6b have potentiometers 14 and 15 as positional detectors for the detection of the rotating angle of the wrist 2 to the arm 3 within the ranges of the angle A and the angle B, the joint 7 has a potentiometer 16 as a positional detector for the detection of the rotating angle of the arm 3 to the support post 4 within the range of the angle C and the joints 8a and 8b have potentiometers 17 and 18 respectively as positional detectors for the detection of the rotating angle of the support post 4 to the stationary bed 5 within the ranges of the angle D and the angle E. The wrist 2 is detachably provided with a handle 19, which is attached to the wrist 2 in the teaching operation and detached therefrom, as required, in the playback operation.

Figure 4:
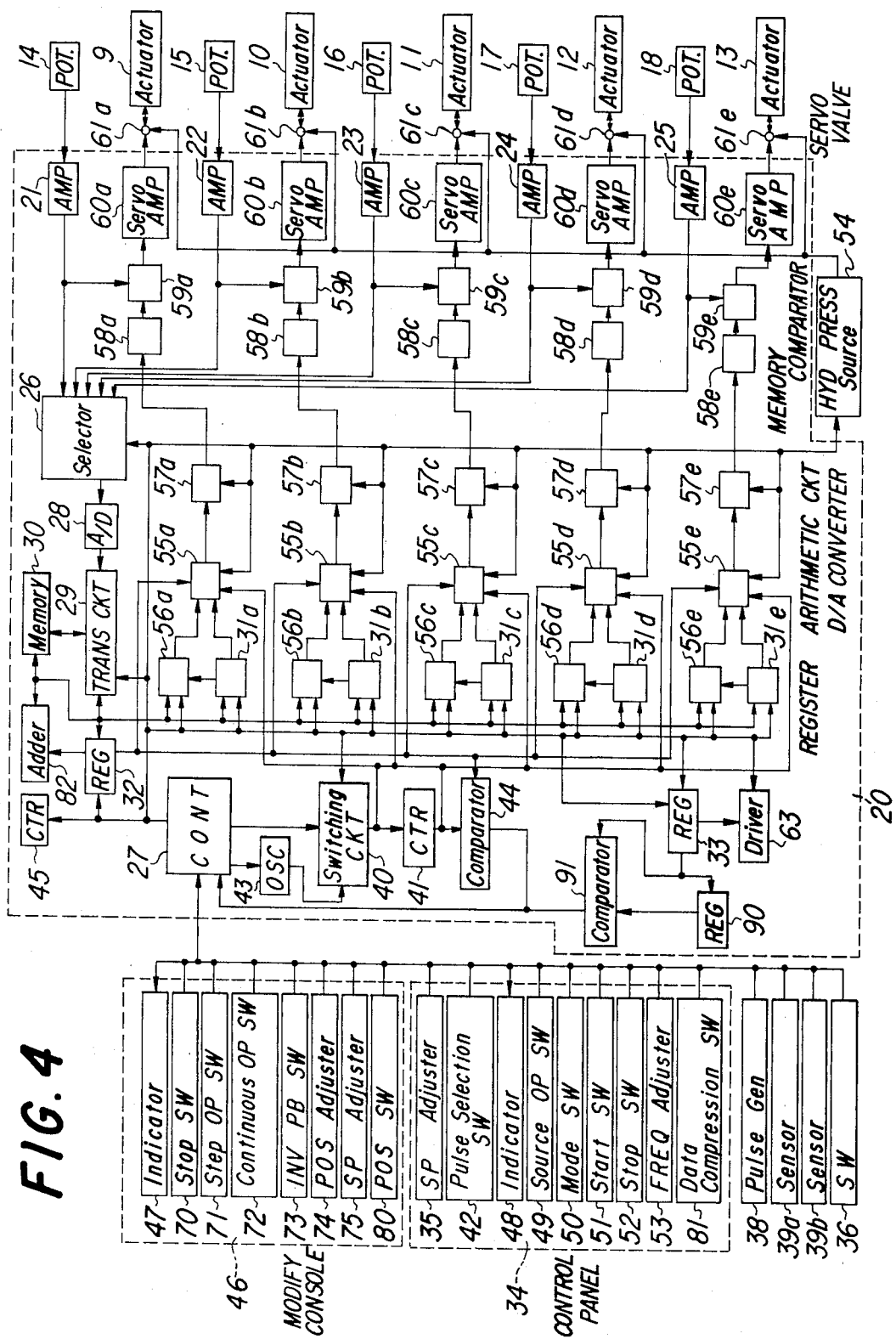
FIG. 4 is a diagram of electric-hydraulic system for the robot shown in FIG. 1.

As shown in FIG. 4, each of electrical positional signals from the potentiometers 14-18 is supplied to each of input circuits 21-25 provided in a control console 20, and each of the positional signals from the potentiometers 14-18 is amplified to a predetermined level in the input circuits 21-25. Each of the positional signals issued from the potentiometers 14-18 to the input circuits 21-25 is supplied to a selected circuit or selector 26. The selector 26, upon teaching operation, orderly selects the positional signals supplied from each of the input circuits by an electrical control signal from a control circuit or controller 27 and supplies the selected positional signals to an analog to digital converter (A/D converter) 28. The A/D converter 28 converts the positional signals in the form of electrical analog signals into electrical digital signals and supplies the converted digital electrical signals to a signal transfer control circuit 29. The signal transfer control circuit 29 supplies, upon teaching operation, the positional signals from the A/D converter 28, division signals and spray start or stop signal as described later to a memory unit 30 by the control signals from the control circuit 27 and also supplies, upon playback operation, positional signals, division signal and spray start or stop signal read out from the memory unit 30 to registers 31a-31e, 32 and 33 by the control signals from the control circuit 27. The memory unit 30 stores therein positional signals supplied from the A/D converter 28 by way of the signal transfer control circuit 29, division signal supplied from a setter or speed adjuster 35 provided in the control panel 34 in the control console 20 and paint spray start or stop signal from the switch 36 provided to the handle 19 successively in the teaching operation. An object W to be painted as a work is moved in a direction X on a conveyor 37. A pulse generator 38 is mounted on the conveyor 37 for detecting the moving amount of the object W, and the pulse generator 38 generates pulses successively in synchronism with the movement of the object W on the conveyor 37 and supplies the generated pulses to the control circuit 27. A detector or sensor 39a is mounted near the conveyor 37 for detecting the passage of the object W, and the detector 39a issues an object passage signal when the object W passes in front of it and supplies the thus issued signal to the control circuit 27. In the case where the teaching or playback operation is conducted for the object W being moved, the pulses from the pulse generator 38 are supplied by way of a switching circuit 40 to a counter 41 after the generation of the object passage signal from the detector 39a. The circuit 40 issues either the pulses from the pulse generator 38 or the pulses from a pulse oscillator 43 to the counter 41 based on the selection signal from a pulse selection switch 42 in a control panel 34. A comparator circuit 44 for comparing the counted value in the counter 41 and the division signal stored in the register 32 supplies a coincidence signal to the control circuit 27 when the counted value coincides a value for specifying the interval for the position designating operation in the teaching operation or a value for specifying the number of division in the interpolating operation upon playback operation. The control circuit 27 supplies control signals to the selection circuit 26, the memory 30 and the like controlled by the coincidence signal from the comparator circuit 44. The number of generation for the coincidence signals from the comparator circuit 44 is counted in a counter 45 and the value counted in the counter 45 is supplied to the digital indicator 47 in a corrector or modify console 46 and to the digital indicator 48 provided on the control panel 34 of the console 20. Each of the indicators 47 and 48 displays the value counted in the counter 45 in decimal indication. The panel 34 has, provided thereon, a hydraulic source actuation switch 49, a teaching/playback mode change switch 50, a start switch 51, a stop switch 52 and a oscillation frequency adjuster 53 consisting of a variable resistor. The switch 49 specifies, by its ON-OFF electric signals, the operation of the hydraulic source 54 in such a manner that the pump of the hydraulic source 54 is started by the control circuit 27 when the switch 42 is turned ON and, while on the other hand, the pump of the hydraulic source 54 is stopped by the control circuit 27 when the switch 49 is turned OFF. The ON or OFF electrical signal from the switch 50 is supplied to the control circuit 27. The control circuit 27 is set to a teaching mode or a playback mode depending on the ON or OFF signal from the switch 50, in which the circuit 27 generates a control signal necessary for the teaching operation when it is set to the teaching mode and generates a control signal necessary for the playback operation when it is set to the playback mode. The set signal from the adjuster 53 is supplied by way of the control circuit 27 to the pulse oscillator 43. The oscillator 43 generates sequential pulses of a certain pulse period in synchronism with the control of the control circuit 27 and the period is set to a predetermined value by the signal supplied from the adjuster 53. The period of the pulse from the pulse oscillator 43 can optionally be adjusted between 5 msec-20 msec by the adjuster 53. The pulses from the change-over circuit 40 are supplied to the counter 41 and to the interpolating operation circuits 55a-55e. The counter 41 counts the pulses supplied from the change-over circuit 40 and supplies the counted value to the operation circuits 55a-55e and to the comparator circuit 44, and the operation circuits 55a-55e execute the interpolating operation for the signals supplied from the registers 56a-56e, 31a-31e and 32, the change-over circuit 40 and the counter 41 under the control of the control circuit 27.

In the case of the playback operation, positional signals are stored in the registers 31a-31e and 56a-56e, and the division signal is stored in the register 32. The set signal is stored in the register 32 in the teaching operation. Each of the operation circuits 55a-55e functions to conduct linear interpolation between the teaching positions $P_i$ and $P_{(i+1)}$ and determines the value based on each of the values Xai-Xei for the position signals at the $i_{th}$ teaching position $P_i$ from each of the registers 56a-56e, each of the values Xa(i+1)-Xe(i+1) for the positional signals at the $(i+1)_{th}$ teaching position $P_{(i+1)}$ from each of the registers 31a-31e, the value Ni for the $i_{th}$ division signal from the register 32 and the counted value Cn from the counter 41. That is, the operation circuit, for example, the circuit 55a executes the operation:

$$Xar = Xai + [Xa(+1) - Xai]/Ni \cdot Cn$$

for determining the value Xar of the interpolation position relative to the range of the angle A between the positions $P_i$ and $P_{(i+1)}$ on every generation of the pulses from the change-over circuit 40, based on the value Xai for the position signal from the register 56a, the value Xa(i+1) for the position signal from the register 31a, the value Ni for the division signal from the register 32 and the counted value Cn from the counter 41. Other operation circuits 55b-55e execute the operations in the same manner and each of the operation circuits 55a–55e issues operation result signals to each of digital to analog converters (D/A converters) 57a–57e. Each of the D/A converters 57a–57e converts the operation result signals supplied as digital electrical signals into analog electrical signals and supplies the analog signals to each of analog memories 58a–58e to hold the signals till the generation of the succeeding operation result signals. Instead of the analog memories 58a–58e, registers for storing the operation result signals as digital signals and holding the signals till the generation of the succeeding operation result signals may be provided between each of the operation circuits 55a–55e and each of the D/A converters 57a–57e. The operation result signals supplied to the analog memories 58a–58e are supplied to comparators 59a–59e in a servo circuit respectively as command values.

Each of the comparators 59a–59e compares the positional signals, as the present value, supplied from the potentiometers 14–18 by way of the input circuits 21–25 with the positional signals, as the command value, supplied from the memories 58a–58e upon playback operation, and supplies difference signals as the result of the comparison to each of servo amplifiers 60a–60e. Each of the servo amplifiers 60a–60e appropriately amplifies the supplied electrical difference signals and supplies the thus amplified difference signals to each of servo valves 61a–61e. Each of the servo values 61a–61e controls the charge and discharge of the hydraulic pressure in the hydraulic source 54 to the hydraulic actuators 9–13 based on the difference signals thus supplied. In this manner, for the positional control of the wrist 2 within the angle A, for example, the potentiometer 14, the input circuit 21, the comparator 59a, the servo amplifier 60a, the servo valve 61a and the actuator 9 constitute a servo circuit, that is, a feedback loop, by which the position of the wrist 2 as the movable member is set to the command values successively inputted to the comparator 59a. Servo circuits are formed in the same manner for the positional control of other movable members.

In the case where the robot is applied to painting work, a paint spray nozzle 62 is attached to the wrist 2 and a switch 36 designating the start or stop for the paint spray from the nozzle 62 is provided to the handle 19. The paint spray start or stop signal generated from the switch 36 upon teaching operation is stored by way of the control circuit 27 into the memory unit 30. While on the other hand, the spray start or stop signal stored in the memory unit 30 is read out upon playback operation to a register 33 for use as a control signal to a paint spray actuator 63.

The operation of the robot having the foregoing constitution is now explained. In the case of the teaching operation, the switch 49 is set to OFF state and the actuation of the pump in the hydraulic source 54 is thereby stopped. In the state where the actuation of the pump in the hydraulic source 54 is stopped and hence the generation of the hydraulic pressure from the hydraulic source 54 is interrupted, each of the movable members is made freely rotatable. Then, the switch 50 is pushed to supply an ON signal to the control circuit 27 so as to operate the circuit 27 in the teaching mode, and the switch 42 is pushed to change the operation mode of the change-over circuit 40 so that the pulses may be supplied from the pulse generator 38 to the counter 41. Further, a value specifying the interval for the position designating operation is set to the setter 35. The setter 35 consists of a digital switch having decimal indication and can optionally set values, for example, of 1–99.

Thereafter, the switch 51 is pushed to drive the control circuit 27 such that it supplies a reset pulse to the counter 45 so as to indicate "0" on the indicators 47 and 48, supplies a reset pulse also to the counter 41 to clear its counted content, and transfers the value set in the setter 35 as a set signal to the register 32 and stores the signal therein. Then, the conveyor 37 is run to move the object W in the direction X and, while on the other hand, the handle 19 is manipulated to move the nozzle 62 along with movement of the object W. Simulated painting work is then conducted to the object W after the object W has passed over the detector 39a.

By the passage of the object W over the detector 39a, the control circuit 27 supplies the pulses from the pulse generator 38 to the change-over circuit 40 which, in turn, outputs the supplied pulses to the counter 41. The counter 41 counts up the supplied pulses successively and outputs the counted value to the comparator circuit 44. If the register 32 contains, for example, 2 as the set signal, the comparator circuits 44 outputs a coincidence signal to the control circuit 27 when the value counted in the counter 41 reaches 2. Upon receiving the coincidence signal, the control circuit 27 stores, into the memory unit 30, each of the positional signals outputted from the potentiometers 14–18 at the position $P_0$ where the nozzle 62 is set at the time the coincidence signal is outputted.

Specifically, the control circuit 27, upon receiving the coincidence signal from the comparator circuit 44, at first outputs a reset signal to the counter 41 to clear the counted value in the counter 41. The circuit 27 also outputs a control signal to the selection circuit 26 to control it so that the selection circuit 26 supplies the positional signals from the potentiometers 14–18 successively to the A/D converter 28, outputs a control signal to the signal transfer control circuit 29 to control it so that the control circuit 29 transfers the positional signals at the digital signals from the A/D converter 28 to the memory unit 30 and further sends an address signal to the memory unit 30 so that it stores therein the positional signals sent from the signal transfer control circuit 29 successively in the specified memory addresses, for example, the positional signal from the potentiometer 14 at the first address, the positional signal from the potentiometer 15 at the second address, ..., the positional signal from the potentiometer 18 at the fifth address respectively. In the case where the switch 36 is not actuated before the coincidence signal is obtained from the comparator circuit 44, the control circuit 27 writes the spray stop signal at the sixth address in the memory unit 30. Further, the control circuit 27 stores the value set in the setter 35 as the division signal Nn at the seventh address of the memory unit 30. The setter 35 is capable of optionally setting the value N as the division signal, for example, of 1–99, and the set value is converted into a binary number and stored as the division signal in the memory unit 30 under the control of the control circuit 27. Since the counter 45 counts the number of generation of the coincidence signals from the comparator circuit 44, in the teaching operation, it indicates "1" on the indicators 47 and 48 as the counted value of the counter 45 after the teaching operation for the position $P_0$. Then, the nozzle 62 is further moved along with the movement of the object W and the counter 41 counts up the pulses from the pulse generator 38. When the comparator circuit 44 outputs a coincidence signal upon movement of the nozzle 62 to the teaching position $P_1$, the positional signals from the potentiometers 14-18 at the position $P_1$ are successively stored in the memory unit 30 and, at the same time, the value set in the setter 35 is stored in the memory unit 30 as the division signal. In the case where the paint spray for the object W is intended to start and the switch 36 is actuated just before the position $P_1$, the spray start signal is stored in the memory unit 30 upon generation of the coincidence signal from the comparator circuit 44. In the same manner as before, the counted value in the counter 45 is advanced by one after the teaching operation for the position $P_1$ and the value indicated on the indicators 47 and 48 is increased to "2". The succeeding procedures are conducted in the same manner, in which the nozzle 62 is moved to the positions $P_2, \ldots, P_i, P_{(i+1)}, \ldots, P_n$ and, by the generation of the coincidence signals at these positions, the positional signals obtained from the potentiometers 14-18 at each of the positions, the division signals set by the setter 35 and the spray start or stop signal are stored in the memory unit 30. After the completion of the teaching operation for the final position $P_n$, when the stop switch 52 is actuated, the control circuit 27 writes an operation end signal into the address next to the address at which the final signals have been stored and writes the number (n+1) for the teaching positions at the 0 address of the memory unit 30.

In the case where the playback operation is to be executed after the teaching operation for the object W being in movement, the switch 49 is at first actuated to the ON state. The control circuit 27, upon receiving the ON signal from the switch 49, outputs a control signal actuating the pump in the hydraulic source 54. When the pump of the hydraulic source 54 is actuated, hydraulic pressure is generated from the hydraulic source 54 and supplied to each of the servo valves 61a-61e. Then, when the switch 50 is actuated to set the control circuit 27 to the playback mode and, thereafter, the start switch 51 is actuated, the control circuit 27 starts the control for the playback operation. At first, by receiving the actuation signal from the switch 51, the control circuit 27 sends reset signals to the counters 41 and 45 to clear the contents of the counters 41 and 45. Then, when the conveyor 37 is run to move the object W and an object passage signal is generated from the detector 39a, the control circuit 27 sends a control signal for specifying the read out of the positional signals, the division signals, and the spray start or stop signal stored at the teaching position $P_0$ to the memory unit 30, and also supplies control signals to the signal transfer control circuit 29 and to each of the registers 31a-31e, 32 and 33, so that each of the read out signals is stored to the corresponding registers. At the same time, the control circuit 27 supplies the pulses from the pulse generator 38 to the change-over circuit 40, and also outputs control signals to the registers 31a-31e and 56a-56e, so that the positional signals which have been stored in the registers 31a-31e are stored into the registers 56a-56e. The values for the positional signals previously stored in the registers 31a-31e are zero in the binary number in the case where the control circuit 27 clears the contents of the registers 31a-31e, 56a-56e and the like at the instance it receives the start signal from the switch 51. It is, however, assumed here for the simplicity of the description that the values Xan-Xen for the positional signals obtained at the teaching position $P_n$ have previously been stored in the registers 31a-31e. Accordingly, the values Xan-Xen for the positional signals are stored in the registers 56a-56e, the values Xao-Xeo for the positional signals obtained at the position $P_0$ are stored in the registers 31a-31e, the value Nn for the division signal is stored in the register 32 and the spray stop signal is stored in the register 33 respectively. When the above values are stored to each of the registers and the change-over circuit 40 supplies the pulses generated from the pulse generator 38 to the counter 41 and to the operation circuits 55a-55e, the operation circuits 55a-55e execute interpolating operation in synchronism with the pulses from the pulse generator 38. Since the counted value "1" is supplied as the counted value Cn from the counter 41 to the operation circuits 55a-55e by the output of one shot of pulse from the change-over circuit 40, the operation circuits, for example, the circuit 50a executes the operation:

$$Xan+(Xao-Xan)/Nn \times 1$$

and other operation circuits 55b-55e execute the operation in the same manner. The results of the operation are issued to the D/A converters 57a-57e respectively. The D/A converters 57a-57e convert the values of the operation results into analog signals and output them to the analog memories 58a-58e respectively. The analog signals supplied to each of the analog memories 58a-58e are supplied as the command values to the comparators 59a-59e. The comparators 59a-59e compare the positional signals from the analog memories 58a-58e with the positional signals, as the present value, from the input circuits 21-25 and output the difference signals to the servo amplifiers 60a-60e. The difference signals supplied from the servo amplifiers 60a-60e control the servo valves 61a-61e respectively, to charge and discharge the hydraulic pressure of the hydraulic source 54 to each of the actuators 9-13, in such a way that the nozzle 62 is set approximately at a calculated position, that is, at the position deviated, on the linear line connecting the positions $P_0$ with $P_n$, from the position $P_n$ to the position $P_0$ about by $1/N_n$ of the segment $\overline{P_0P_n}$ (at the position about $\frac{1}{2}$ of the segment $\overline{P_0P_n}$ where $N_n=2$). Then, when the change-over circuit 40 outputs one shot of pulse again generated from the pulse generator 38 to change the counted value Cn to 2 in the counter 41, the operation circuit, for example, the circuit 55a executes the operation:

$$Xan+(Xao-Xan)/Nn \times 2$$

in synchronism with the second shot of pulse from the change-over circuit 40. Other operation circuits 55b-55e execute operations in the same manner. In the case where the value Nn for the division signal set by the setter 35 is, for example, 2 in the teaching operation at the position $P_0$, since the register 32 contains a binary value corresponding to 2, the operation circuits 55a-55e output the values Xao-Xeo for the positional signals as the results of the operation respectively, and the comparator circuit 44 that compares the contents of the register 32 with the counted value in the counter 41 detects the coincidence and outputs a coincidence signal to the control circuit 27. The values Xao-Xeo for the positional signals from the operation circuits 55a-55e are converted into analog signals, stored in the analog memories 58a-58e and supplied to each of the servo circuits as the command values, by which the nozzle 62 is set at the position $P_0$.

Then, the control circuit 27, upon receiving the coincidence signal from the comparator circuit 44, outputs one shot of pulse to the counter 45 in order to advance the counted value by one in the counter 45 and also outputs a reset pulse to the counter 41 to reset the counted value in the counter 41 to zero. Thus, the indicators 47 and 48 display "1". Further, the control circuit 27 checks whether the spray start signal is stored or not in the register 33 and, if the spray start signal is stored in the register 33, outputs an actuation start signal to the paint spray actuator 63. Since the spray start has not yet been designated at the teaching position $P_0$ and hence the spray start signal is not stored at this time in the register 33, the paint is not sprayed from the nozzle 62. Thereafter, the control circuit 27 sends a read out control signal to the memory unit 30 so as to read out the positional signals, the division signal and the spray start or stop signal stored at the teaching position $P_1$ and, at the same time, supplies control signals to the signal transfer control circuit 29 and to each of the registers 31a–31e, 32 and 33 so as to store each of the read out signals in each of the registers. Further, the control circuit 27 also supplies control signals to the registers 31a–31e and 56a–56e so as to transfer the positional signals stored in each of the registers 31a–31e to the registers 56a–56e. Thus, the positional signals at the teaching position $P_0$ are stored in the registers 56a–56e and the positional signals at the teaching position $P_1$ are stored in the registers 31a–31e respectively. Thereafter, when the change-over circuit 40 generates one shot of pulse and supplies it to the operation circuits 55a–55e and to the counter 41, the operation circuits 55a–55e execute operations in the same manner as above, upon reception of the one shot of pulse, and output the results of the operations to the D/A converters 57a–57e respectively. That is, they execute the operation:

$$X_{a0} + (X_{a1} - X_{a0})/N_0 \times C_n$$

based on the counted value $C_n$ in the counter 41. In the case where the value $N_0$ for the division signal is set to 20 instead of 2 as in the previous case, each of the operation circuits 55a–55e outputs the positional signals corresponding to every changes of the counted value in the counter 41 so that the nozzle 62 is positioned, on a linear line connecting the positions $P_0$ and $P_1$, from the position $P_0$ to the position $P_1$ each by about 1/20 of the segment $\overline{P_0P_n}$.

The positional signals from each of the operation circuits 55a–55e are supplied by way of the D/A converters 57a–57e and the memories 58a–58e to each of the servo circuits respectively. Each of the servo circuits moves the nozzle 62 while referring the positional signals from the memories 58a–58e as the command values and based on the positional signals from the inputs circuits 21–25 as the present values. When the counted value in the counter 41 reaches 20, the comparator circuit 44 outputs a coincidence signal to the control circuit 27. The control circuit 27 supplies one shot of pulse to the counter 45 so as to indicate "2" on the indicators 47 and 48 and, at the same time, outputs a clear signal to the counter 41 and issues the next control signals in the same manner as above. Since the spray start signal has been stored in the memory unit 30 at the teaching position $P_1$, the spray start signal is contained in the register 33. The control circuit 27 detects the spray start signal and issues an actuation start signal to the actuator 63 after receiving the coincidence signal from the comparator circuit 44. Upon receiving this actuation start signal, the actuator 63 supplies the paint to the nozzle 62 and, consequently, the paint is sprayed from the nozzle 62 and coated to the object W at the position $P_1$. The succeeding operation procedures are conducted in the same manner, in which the nozzle 62 is successively positioned at the positions $P_2, \ldots, P_i, P_{(i+1)}, \ldots P_n$ and simultaneously sprays the paint for applying necessary coating to the object W. In the case where the spray stop signal in the register 33 is detected after the positioning to the position $P_n$, the control circuit 27 sends the actuation stop signal to the actuator 63 and the actuator 63 stops the paint supply operation upon receiving this actuation stop signal, whereby the paint spray from the nozzle 62 is stopped. Thereafter, the control circuit 27 starts the reading for the next positional signals and the likes from the memory unit 30. Since the operation end signal has been written into the address succeeding to the address at which the positional signals and the likes relevant to the teaching position $P_n$ have been stored, the control circuit 27 completes the playback control operation upon detecting the reading for the operation end signal and is then put to the stand-by state for detecting the generation of the next start signal or the generation of the object passage signal from the detector 39a. After the detection of the operation end signal, the control circuit 27 checks the contents stored at 0 address in the memory unit 30, that is, the number (n+1) for the teaching positions and the counted contents in the counter 45 to confirm that the playback operation has been conducted normally.

Although the robot is manipulated in synchronism with the movement of the object W using the pulses from the pulse generator 38 in the above embodiment, the robot can also be manipulated in the same manner while staying the object stationary or in an asynchronous manner with the movement of the object W. In the later case, the pulses from the pulse oscillator 43 instead of the pulses from the generator 38 are supplied to the counter 41 and to the operation circuits 55a–55e, by adapting to output the pulses generated in the pulse oscillator 43 from the change-over circuit 40 by the push of the switch 42.

Although the foregoing embodiments have been constituted to successively perform the teaching operation continuously, this invention is no way limited to such embodiments. In one modified embodiments, for instance, a temporary stop switch 70 is provided to a portable corrector 46, so that the control operation of the control circuit 27 may be interrupted by the push of the switch 70 before the reading of new positional signals in the playback operation, and new teaching operation can be conducted for positions after the position for which the playback has been interrupted. Provision of the step switch 70 for enabling the playback control to be interrupted at optional positions leads to easy correction for the teaching position. Where a teaching position is to be deleted in the correction of the teaching position, the teaching program can be rearranged by storing the positional signals and the likes at the teaching position next to the teaching position to be deleted at each of the addresses of the memory unit 30 at which the positional signals and the likes for the teaching position to be deleted have been stored, and storing the positional signals and the likes for succeeding teaching positions at each of the addresses of the memory unit 30 carried up successively. While on the other hand, addition of a teaching position in the correction can be attained, for example, by actuating the stop switch 70 at the position one step before the adding position to interrupt the playback control of the control circuit 27 and then perform the teaching operation to the adding position in the teaching mode and storing the positional signals and the likes relative to the teaching positions subsequent to the adding position at each of the addresses carried down successively. The exact point at which the teaching position is read out from the memory unit 30 in the playback operation can be confirmed by the indicators 47 and 48 which indicate the counted value in the counter 45.

Provision of the above stop switch 70 makes it possible to correct each of the teaching positions and to increase or decrease the number of teaching positions thereby providing a manipulator excellent in versatile application uses. In a further embodiment, positional siganls and the likes only for one optional position are stored in the memory unit 30 in the teaching operation and the teaching operations for all of other teaching positions are performed in the correcting operation. In a further embodiment, a stepwise operation switch 71 and a continuous operation switch 72 are provided to the corrector 46, and the control circuit 27 is constituted such that the nozzle 62 is moved stepwise at each teaching position on every actuation of the switch 71 after the push of the switch 70 and, while on the other hand, the nozzle 62 is moved continuously during the push of the switch 72 in the playback operation. Further, an adverse playback switch 73 may be added so that the playback operation can also be performed in an adverse manner as: $P_n, P_{n-1}, \ldots, P_2, P_1$ by the push of the adverse switch 73. It is preferably adapted such that where the playback operation is temporarily stopped by the push of the switch 70, the conveyor 37 is also stopped and where the playback operation is conducted stepwise, continuously or adversely by the push of the switches 71, 72 or 73, the pulses generated in the pulse generator 38 are outputted correspondingly from the change-over circuit 40. A still further embodiment has a position adjuster 74 provided to the corrector 46 which can set the required vertical and horizontal moving amounts irrespective of the positional signals stored in the memory unit 30, so that the nozzle 62 may be moved by the amounts set thereby. Furthermore, another setter 75 identical with the setter 35 may be provided to the corrector 46, so that the interval for the position designating operation may be set by the setter 75 optionally also on the side of the corrector 46.

Description is then made of another embodiment of this invention, in which actuation data for use in the playback operation are stored in a compressed manner in the memory unit 30 and actual playback operation is conducted based on the compressed data.

In this embodiment, the corrector 46 has a switch 80 for designating a position $P_i$ with regard to the object W, the panel 34 has a designation switch 81 for designating data-compressing playback operation, and the control console 20 has an addition circuit or adder 82. An actuation signal from the switch 80 is supplied to the control circuit 27 which, in turn, supplies control signals to the memory unit 30 and other units under the actuation signal from the switch 80. The number of actuation for the switch 80 is counted in the counter 45. The switch 81 is pushed for preparing compressed data after the teaching operation and the control circuit 27 is set to a data-compressing playback mode upon receiving the actuation signal from the switch 81. When the data-compressing playback mode is set, the addition circuit 82 accumulates the division signals stored in the register 32 for the interval between two succeeding actuations for the switch 80. The division signals accumulated in the addition circuit 82 are stored as the compression data in the memory unit 30.

The procedures for preparing the compression data in the robot having such a constitution is to be explained. For preparing the compression data, the robot is at first manipulated in the teaching mode as described previously, by which data not yet compressed are once stored in the first memory region of the memory unit 30. Thereafter, the same playback operation as described before is conducted by the robot based on the data stored in the first memory region. That is, the robot is manipulated in the data-compressing playback mode.

In the data-compressing playback operation, the conveyor 37 is run at a conveyor speed sufficiently decreased so as to enable the operator to designate necessary teaching positions.

Specifically, the speed of the conveyor 37 is set such that the interval for the occurrence of the pulses in the pulse generator 38 may be increased sufficiently. The switch 81 is pushed to set the control circuit 27 to the data-compressing playback operation mode. Then, playback operation based on the teaching data stored in the first memory region of the memory unit 30 is conducted by the robot, by which the nozzle 62 is successively positioned at positions $P_n, P_0, P_1, \ldots, P_i, P_{(i+1)}, \ldots$, at a low speed, and the addition circuit 82 successively adds the division signals stored in the register 32 on every reading of the signals at the position $P_i$ unless the switch 80 is pushed. In the data-compressing playback operation, when the positional signal, the division signal and the spray start or stop signal for the initial position $P_0$ are read out from the first memory region of the memory unit 30, these signals are respectively contained into the registers 31a–31e, 32 and 33 and instantly stored to the second memory region of the memory unit 30 in the same order as they were written into the first memory region. While on the other hand, transfer of the division signals stored in the register 32 is not conducted to the addition circuit 82. Then, when the operator pushes the switch 80 at the positioning of the nozzle 62, for example, to the position $P_x$, the control circuit 27 stores the same signals as the positional signals stored in the registers 31a–31e, the addition result signals in the addition circuit 82 (which are the same value as the division signal in the register 32 at the position $P_x$) and the spray start or stop signal stored in the register 33 into the second memory region of the memory unit 30 at the address next to the address where each of the signals regarding the position $P_0$ is stored, and clears the addition results to 0 in the addition circuit 82. That is, the positional signal, the division signal and the spray start or stop signal obtained at the position $P_1$ in the teaching operation are respectively stored in the second memory region of the memory unit 30 by the push of the switch 80 at the position $P_x$. Further, when the operator pushes the switch 80 at the positioning of the nozzle 62, for example, to the position $P_y$, the control circuit 27 functions in the same manner as above, in which it stores the positional signal stored in the registers 31a–31e, the addition result signal in the addition circuit 82 (which has the value adding the divisional signal at the position $P_2$ and the divisional signal at the position $P_3$, at the position $P_y$) and the spray start or stop signal stored in the register 33 to the second memory region of the memory unit 30 at the address next to the address where each of the signals regarding the position $P_1$ is stored, and clears the addition results to 0 in the addition circuit 82. That is, the positional signal and the spray start or stop signal obtained at the position $P_3$ in the teaching operation, and the addition results for the division signals set at the positions $P_2$ and $P_3$ are stored in the second memory region of the memory unit 30 by the push of the switch 80 at the position $P_y$. Since the counter 45 also counts up the number of actuation for the switch 80 as described before, it indicates the counted value "3" at this point (the counted value in the counter 45 is increased by one in the storing operation regarding the position $P_0$). The subsequent procedures are conducted in the same manner as above, in which each of the signals is stored to the second memory region of the memory unit 30 on every push of the switch 80. Thereafter, when the switch 80 is pushed at a position just before the position $P_n$, the positional signal, spray start or stop signal and the addition results in the addition circuit 82 obtained at the position $P_n$ are respectively stored in the second memory region of the memory unit 30. When the operation end signal is read out from the first memory region of the memory unit 30, the control circuit 27 writes an operation end signal next to the final signal in the second memory region and writes the number of compressed teaching positions, that is, the counted value m+1 (m≦n) in the counter 45 at the 0 address of the second memory unit. While on the other hand, if the switch 80 is not pushed before the positioning of the nozzle 62 at the position $P_n$, the control circuit 27 conducts the same control function as above, regarding the read out of the operation end signal from the memory unit 30 as the push of the switch 80 and stores each of the signals to the second memory region of the memory unit 30. The data compressing-playback operation has thus been completed and the compressed teaching data are stored in the second memory region of the memory unit 30. Then, the actual playback operation can be conducted thereafter by reading out the teaching data, that is the positional signals, the division signals and the spray start or stop signals stored in the second memory region while moving the conveyor 37 at a regular speed.

In the case where the playback operation is performed based on the compressed teaching data stored in the second memory region, the control circuit 27 and the like perform the same control functions as those for the playback operation conducted based on the teaching data stored in the first memory region. Once after the necessary compressed teaching data have been stored in the second memory region, the first memory region of the memory unit 30 can be used for other teaching operations.

A further embodiment of this invention capable of data compression is to be explained.

In this embodiment, a comparison circuit is incorporated to each of the interpolating operation circuits 55a-55e in the control console 20 so that the interpolating operation circuits 55a-55e are substantially constituted as comparison and interpolating operation circuits.

Each of the comparison/operation circuits 55a-55e compares to determine the difference between the value for the positional signal at the position $P_i$ stored in each of the registers 56a-56e and the value for the positional signals at the position $P_{(i+1)}$ stored in each of the registers 31a-31e, and outputs a store indication signal to the control circuit 27 in the case where the difference is larger than a predetermined value or where the polarity (positive or negative) of the difference is different from that of the difference in the comparative operation executed just before. The value previously set to each of the comparison/operation circuits 55a-55e is determined so that the paint spray nozzle 62 attached to the wrist 2 may be positioned within an allowable range in the playback operation.

A register 90 and a comparator 91 are further provided in the control console 20 in this embodiment. The register 90 stores the spray start or stop signal contained so far in the register 33 when a new spray start or stop signal is to be stored in the register 33 in the teaching operation. In the teaching operation, the content of the register 33 and the content of the register 90 are compared to each other by the comparator 91 and the comparator 91 sends a store designation signal to the control circuit 27 if the contents are different from each other. In this embodiment, if the store designation signal is issued neither from the comparison/operation circuits 55a-55e nor from the comparator 91 in the comparative operation of the comparison/operation circuits 55a-55e and in the comparator 91, the addition circuit 82 conducts adding operation for the division signal stored in the register 32 and the division signal prior to the store of the division signal mentioned just above, and stores the addition results. Further, if no store designation signal is issued also in the next comparative operation, the addition circuit 82 conducts adding operation for the addition results for the division signals and the division signal newly stored in the register 32 and stores the new addition results. While on the other hand, if the store designation signal is issued in the comparative operation, the addition circuit 82 newly stores the division signal contained in the register 32.

The operation of the robot having such comparison/operation circuits 55a-55e will now be explained. The teaching operation is conducted in the same manner as in the first embodiment, in which the actuation data comprising the positional signals, division signals and the like are at first stored in the first memory region of the memory unit 30. When the store of the actuation data to the first memory region has been completed, the control circuit 27, while kept at the teaching mode, reads out the positional signal, division signal and the spray start or stop signal stored at the position $P_0$ from the memory unit 30, supplies these read out signals respectively to the registers 31a-31e, 32 and 33 and, at the same time, stores these positional signal, division signal and spray start or stop signal in the second memory region of the memory unit 30 in the order as they were stored. The counter 45 receives one shot of pulse from the control circuit 27 upon store of the positional signal, the division signal and the spray start or stop signal to the second memory region of the memory unit 30, and the indicators 47 and 48 that indicate the counted value in the counter 45 indicate "1" respectively. Further, the control circuit 27 reads out the positional signal, division signal and the spray start or stop signal stored at the position $P_1$ from the first memory region of the memory unit 30, stores these read out signals respectively into the registers 31a-31e, 32 and 33 and transfers and stores the positional signal at the position $P_0$ contained in the registers 31a-31e into the registers 56a-56e, the division signal at the position $P_0$ contained in the register 32 to the register of the addition circuit 82 and the spray start or stop signal at the position $P_0$ contained in the register 33 into the register 90 respectively. After the above signals have been contained, the comparison/operation circuit 55a–55e and the comparator 91 start their comparative operation. Each of the comparison/operation circuits 55a–55e determines the difference between the positional signals contained in the registers 56a–56e and the positional signals contained in the registers 31a–31e, and checks whether the absolute value for the difference exceeds the predetermined value. The comparator 91 detects whether the spray start or stop signal contained in the register 33 is different or not from the spray start or stop signal contained in the register 90. In the first comparative operation, the polarity difference between the calculated differences is not judged but the polarity is regarded as always different or identical. Each of the comparison/operation circuits 55a–55e sends the store designation signals to the control circuit 27 if the absolute value for the difference is larger than the predetermined value or if a difference is present for the polarity between the differences as the result of the comparison. While on the other hand, it does not send the store designation signal if the absolute value for the difference is smaller than the determined value or if the difference is absent for the polarity between the differences as the result of the comparison. In the same manner, the comparator 91 sends a store designation signal to the control circuit 27 if the spray start or stop signals contained in the registers 33 and 90 are different from each other, that is, if a spray start signal is contained in one of the registers and a spray stop signal is contained in the other of the registers. While on the other hand, it does not send the store designation signal if the same signals are contained in both of the registers 33 and 90. The comparison/operation circuits 55a–55e store the polarity of the difference obtained in the comparative operation to the internal register for using it in the next comparison. The control circuit 27, upon receiving the store designation signal from any of the comparison/operation circuits 55a–55e or from the comparator 91, stores the positional signal, the division signal and the spray start or stop signal contained in the registers 31a–31e, in the register of the addition circuit 82 and in the register 33 respectively into the second memory region of the memory unit 30 where each of the signals for the position $P_0$ is stored next to each of the signals at the position $P_0$, newly stores the positional signal in the registers 31a–31e into the registers 56a–56e respectively, the division signal in the register 32 into the register of the addition circuit 82 and the spray start or stop signal in the register 33 into the register 90 respectively, again reads out the stored positional signal, the division signal and the spray start or stop signal at the position $P_2$ from the first memory region of the memory unit 30 and stores these read out signals respectively into the registers 31a–31e, 32 and 33. While on the other hand, if the control circuit 27 receives the store designation signal neither from the comparison/operation circuits 55a–55e nor from the comparator 91 after the comparative operation, it does not store the positional signals, the division signals and the spray start or stop signals to the second memory region of the memory unit 30 but clears the positional signals in the registers 31a–31e and the spray start or stop signals in the register 33. At the same time, the circuit 27 transfers the division signal in the register 32 to the addition circuit 82 causing the circuit to add the transferred division signal to the division signal at the position $P_0$ contained in the register of the addition circuit 82, stores the newly obtained addition results in the register of the addition circuit 82. Then, the control circuit 22 reads out again the positional signal, division signal and the spray start or stop signal stored at the position $P_2$ from the first memory region of the memory unit 30 and stores each of the read out signals to the registers 31a–31e, 32 and 33. The control circuit 27 issues one shot of pulse to the counter 45 upon every reception of the store designation signals to step up the counted value in the counter 45. Specifically, the counted value in the counter 45 is increased by one on every store of the data block comprising the positional signal, the division signal and the spray start or stop signal at a position into the second memory region of the memory unit 30 and, accordingly, the number of stores for the data blocks to the second memory region of the memory unit 30 can be indicated on the indicator 47 or 48. The operations are conducted in the same manner after each of the signals at the position $P_2$ has been read out, in which the control circuits 27 maintains the positional signal in the registers 56a–56e and the spray start or stop signals in the register 90 as they are unless the store designation signal is received and controls the addition circuit 82 to successively add the division signals and stores the newly read out positional signals and the likes into the registers 31a–31e, 32 and 33. While on the other hand, upon receiving the store designation signal, the control circuit 27 stores the position signal contained in the registers 31a–31e, the division signals either accumulated or not accumulated in the register of the addition circuit 82 and the spray start or stop signal contained in the register 33 successively to the second memory region of the memory unit 30 and stores the position signal in the registers 31a–31e into the registers 56a–56e, the division signal in the register 32 into the register of the addition circuit 82 and the spray start or stop signal in the register 33 into the register 90 respectively. When the control circuit 27 further reads out the operation end signal from the memory unit 30 after reading out each of the signals for the position $P_n$, the circuit 27 checks if the store designation signals are obtained or not in the comparative operation after the read out for each of the signals at the position $P_n$ (the check can be conducted by reading out the division signal, for example, at the position $P_n$ from the first memory region of the memory unit 30 again and comparing the read out division signal with the division signal contained in the register of the addition circuit 82). If the store designation signal has been obtained, the control circuit 27 stores the operation end signal in the second memory region of the memory unit 30 at the address next to the address where the signals for the position $P_n$ are stored, and stores the counted value $m+1$ ($m \leq n$) in the counter 45 at 0 address in the second memory unit. While on the other hand, if the store designation signal has not been obtained, the control circuit 27 reads out each of the signals for the position $P_n$ from the first memory region of the memory unit 30, stores the read out signals again to the second memory region of the memory unit 30. Thereafter, the circuit 27 stores the operation end signal to the second memory region in the same manner as described before and stores the value $m+1$ (counted value $m$ in the counter $45+1$) into the 0 address. Thereafter, the positional signals, the division signals and the spray start or stop signals stored in the second region of the memory unit 30 are used for the playback operation. Accordingly, the first memory region of the memory unit 30 in which each of the signals at the positions $P_0, P_1, \ldots P_n$ is stored can be utilized for other teaching operations. The data can thus be stored in a compressed manner into the memory unit 30 as the actuation data for the robot manipulator 1.

Although the completion of the robot operation is designated by the push of the switch 52 in the above embodiment, the robot operation, for example, the teaching operation can be completed automatically by the provision of a detector or sensor 39b which is similar to the detector 39a near the conveyor 37 to detect the passage of the object W by this detector 39b and complete the robot operation when the detector 39b provides a signal indicating the passage of the object W.

The robot according to this invention is no way limited to the painting use but can also be applied to other uses such as a robot for welding use having a welding torch provided to the robot manipulator.

What is claimed is:

1. A robot comprising:
   a manipulator having a plurality of movable members, each member connected to its adjacent member with a joint;
   means for detecting the relative positions of adjacent movable members with respect to each other;
   means for automatically generating positional signals from the detecting means upon teaching operation;
   memory means for successively storing the positional signals from the generating means;
   means for executing interpolating operation based on two positional signals which are read out from the memory means in order to determine required number of positions between the position corresponding to the two read out positional signals upon playback operation; and
   means for positioning each of the movable members of the manipulator, referring to the operation result signals from the interpolating operation means as command values and based on the positional signals from the detecting means as present values.

2. The robot of claim 1, which further comprises setting means capable of optionally adjusting an interval for the position generating operation in the automatic generating means, the positional signals being successively stored in the memory means at the interval set by the setting means.

3. The robot of claim 2, in which the automatic generating means comprises means for producing a series of pulses, means for counting supplied pulses thereto from the producing means, and means for comparing the counted value in the counting means with the value set by the setting means, the positional signals from the detecting means being generated by the automatic generating means and stored in the memory means when the comparison means detects coincidence between the counted value and the value set by the setting means.

4. The robot of claim 3, in which the producing means generates the pulse in synchronism with the movement of a work piece.

5. The robot of any one of claims 2 to 4, in which the number of positions between two positions determined by the interpolating operation of the interpolating operation means are defined by the value set by the setting means.

6. The robot of claim 1, in which the memory means having first and second memory regions, the positional signals generated by the automatic generating means being stored in the first memory region, and which further comprises means for manually generating the positional signals read out from the first memory region upon an operation for data compression, the positional signals generated by the manual generating means being re-stored in the second memory region of the memory means upon the operation for data compression, the interpolating operation means executing the interpolating operation based on successive two positional signals read out from the second memory region upon the playback operation.

7. The robot of claim 6, in which the automatic generating means comprises means for producing a series of pulses, means for counting supplied pulses thereto from the producing means, and means for comparing the counted value in the counting means with a predetermined value, the positional signals from the detecting means being generated by the automatic generating means and stored in the first memory region of the memory means when the comparison means detects a coincidence between the counted value and the predetermined value.

8. The robot of claim 7, which further comprises setting means capable of optionally adjusting the value compared with the counted value in the counting means by the comparing means, the number of positions between two positions determined by the interpolating operation of the interpolating operation means being defined by the value set by the setting means.

9. The robot of any one of claims 6 to 8, in which the manual generating means comprises a switch, the positional signals read out form the first memory region of the memory means being generated by the manual actuation of the switch and restored in the second memory region of the memory means.

10. The robot of claim 1, which further comprises means for comparing first positional signals at first teaching position designated by the automatic generating means with second positional signals at second teaching position succeeding to the first teaching position generated by the automatic generating means in the teaching operation, and the second positional signals at the second teaching position are stored in the memory means as the positional signals for the playback operation upon detection of predetermined changes between the first and second positional signals by the comparing means.

11. The robot of claim 10, in which the comparing means has a circuit for detecting the difference between the positional signals.

12. A teaching-playback type robot, comprising:
   memory means for storing actuation information for the playback operation to a robot manipulator;
   means for comparing first actuation information at first teaching position with second actuation information at second teaching position succeeding to the first teaching position in the teaching operation, the second actuation information at the second teaching position being stored in the memory means as the information for the playback operation upon detection of predetermined changes between the first and second actuation information by the comparing means; and
   means for actuating a robot manipulator in accordance with the actuation information read out from the memory means.

13. The teaching-playback type robot of claim 12, in which the first and second actuation information include positional signals for positioning the manipulator, respectively, and the comparing means has a circuit for detecting a difference between the positional signals of the first and second actuation information.

14. The teaching-playback type robot of claim 12 or 13, in which the actuation information includes ON-OFF signals for operating a tool mounted on the manipulator, respectively, and the comparing means has a circuit for detecting a difference between the ON-OFF signals of the first and second actuation information.

15. A manipulator apparatus, comprising:
a manipulator having a plurality of movable member, each member connected movably to its adjacent member through joint mechanisms, and being provided with a tool on the free end thereof;
means for detecting the relative positions of adjacent movable members with respect to each other;
means for automatically generating positional signals issued from said detecting means upon teaching operation;
means for comparing positional signals of first taught position generated by said generating means with positional signals of second taught position succeeding to said first taught position generated by said generating means upon the teaching operation;
memory means for successively storing said positional signals of the second taught position in the case where said comparing means detects the predetermined change between said positional signals of the first and second taught positions; and
means for positioning each of said movable members in accordance with a comparison of positional signals produced on the basis of the positional signals from said memory means as command signals and positional signals issued from said detecting means as present positional signals, upon playback operation.

16. A manipulator apparatus according to claim 15, which further comprises:
means for executing an interpolating operation on the basis of successive two positional signals read out from said memory means to interpolate positions between the positions corresponding to said successive two positional signals upon playback operation; and
positional signals corresponding to said interpolated position being supplied to said positioning means as said command signals.

17. A manipulator apparatus according to claim 16, which further comprises:
means for manually adjusting the intervals for the generating operation of said automatic generating means, said positional signals from the detecting means being generated by said automatic generating means at intervals having a value set by said manual adjusting means; and
said set value defining the number of said positions to be interpolated upon playback operation.

18. A manipulator apparatus according to claim 17, in which said automatic generating means comprises:
means for producing electric pulses in synchronism with the movement of a workpiece;
means for counting the supplied pulses thereto from said pulse producing means; and
a second comparison means for comparing the counted value of said counting means with the value set by said manual adjusting means, the positional signals from said detecting means being generated by said automatic generating means when said second comparing means detects coincidence between the counted value and the value set by the manual adjusting means.

19. A manipulator apparatus according to claim 17, in which said automatic generating means comprises:
means for producing electric pulses at time intervals independently of the position of a workpiece;
means for counting the supplied pulses thereto from said pulse producing means; and
a second comparing means for comparing the counted value of said counting means with the value set by said manual adjusting means,
the positional signals from said detecting means being generated by said automatic generating means when said second comparing means detects coincidence between the counted value and the value set by the manual adjusting means.

* * * * *